Dec. 29, 1931.   J. LEPIANE ET AL   1,838,690
MOTOR HEDGE TRIMMER
Filed Aug. 12, 1929
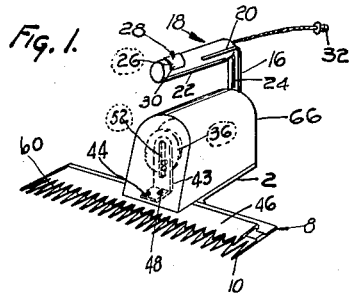
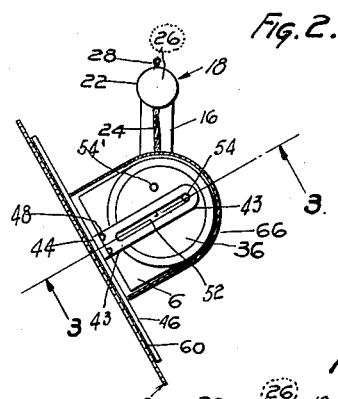
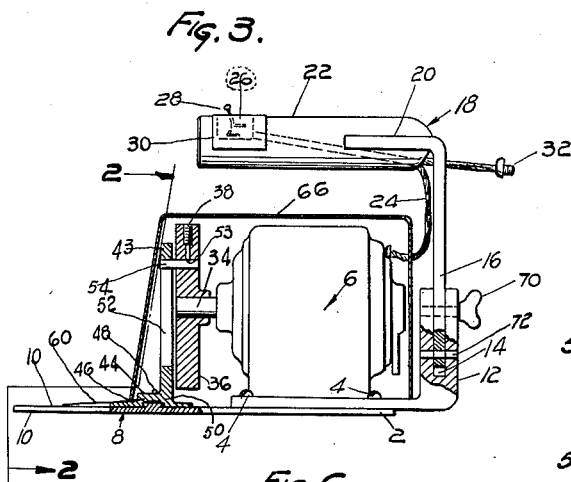
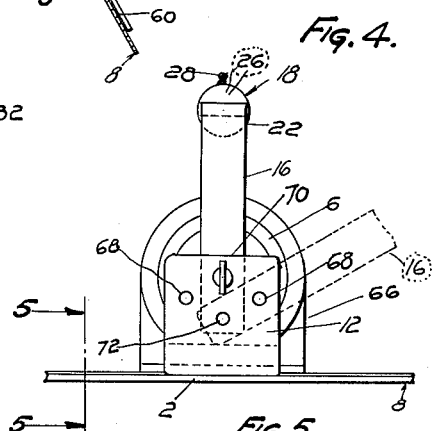
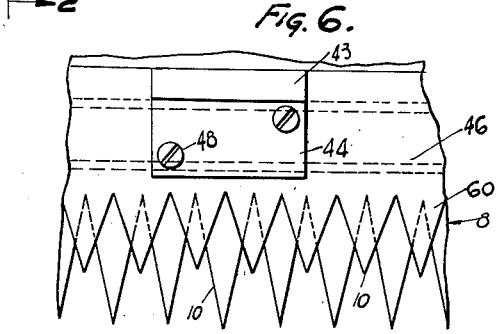
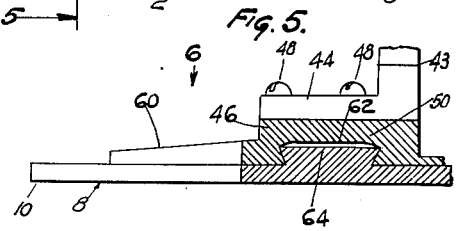
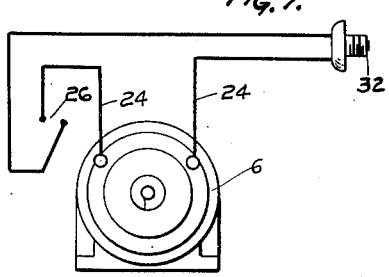
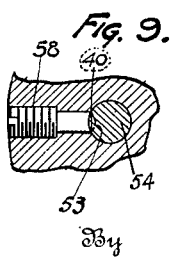
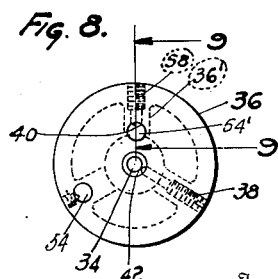
Inventors
J. LEPIANE
P. LEPIANE
Attorney Patented Dec. 29, 1931

1,838,690

UNITED STATES PATENT OFFICE

JOE LEPIANE AND PETER LEPIANE, OF LOS ANGELES, CALIFORNIA

MOTOR HEDGE TRIMMER

Application filed August 12, 1929. Serial No. 385,212.

Our invention relates to motor hedge trimmers, and more particularly to such trimmers in which an electric motor, preferably of the alternating current type, is adapted to actuate a pair of relatively movable cutter blades, said trimmer being adapted to eliminate man power, and reduce to a minimum the time consumed in cutting and trimming a hedge.

It accordingly is an object of our invention to provide a novel form of hedge trimmer having a pair of relatively reciprocating cutting elements, preferably of the toothed variety, a suitable motor, such as an alternating current motor, being provided with a power transmitting means, such as a novel form of fly wheel, which fly wheel is equipped with means, such as a pin for converting the rotary movement of said motor to the reciprocatory movement of the cutting elements through a suitable slotted guide, means being also provided for locking said pin in position, and a means provided for varying the speed of travel of said cutting elements, a protective cover for said motor and power transmitting means being also provided, said trimmer having also a combined motor controlling means, such as a switch, and trimmer applying means in the shape of a suitable handle.

The above, and further objects and advantages of our invention, as will hereinafter more fully appear, are set forth in the specification and illustrated in the drawings, forming a part of our application.

Reference is had to the accompanying drawings, in which similar reference characters denote similar parts. In the drawings, Fig. 1 is a perspective view of our invention with cover or housing in position, Fig. 2 is a sectional view taken on the line 2—2, Fig. 3, looking in the direction of the arrows, but illustrating how the handle or trimmer applying means may be adjusted to cut the hedge in different places, Fig. 3 is an enlarged cross-sectional view through our invention, on the line 3—3, Fig. 2, Fig. 4 is an end elevational view, looking from the right, Fig. 3, Fig. 5 is an enlarged, fragmentary cross-sectional view, taken on the line 5—5, Fig. 4, looking in the direction of the arrows, Fig. 6 is a fragmentary top plan view of Fig. 5, Fig. 7 is a diagrammatic view of the electric circuit, Fig. 8 is an elevational view of a modified form of fly wheel, and Fig. 9 is a cross-sectional view, taken on the line 9—9, Fig. 8.

Describing our invention more in detail, in its broader aspects, said invention comprises a motor, preferably, though not necessarily, of the electric type, which may use alternating or direct current, said motor having its shaft associated with a suitable transmission mechanism, for connecting the rotary movement of said shaft to the reciprocating movement of at least one of a pair of relatively movable cutting elements, such as a pair of toothed blades. For the purpose of applying the trimmer to the hedge, or other shrub to be trimmed, the device is provided with a combined handle and motor control, which may be in the form of an overlapping handle, adapted to be adjusted to at least two positions, so as to facilitate the use of the trimmer in that it may be applied at different angles, a switch, if the motor is of the electric type being preferably positioned in said handle for controlling said motor.

More specifically, said invention comprises a motor support or plate 2, upon which is anchored in any suitable way, as by bolts 4, a motor 6, preferably of the alternating current type, and preferably integral with the support or plate 2 is the lower stationary cutter element 8, which element is preferably provided with sharpened teeth 10, said base or support and said cutter element being constructed of any material in practice preferred.

Associated with the rear end of the plate or support 2, in any suitable way are the uprights or standards 12 forming a bracket, which in practice may take any desired form, said standards being spaced apart as at 14 to receive the arm 16 of the handle or trimmer applying means 18.

The arm 16, constructed of suitable material, but preferably light, so the weight of the device will be reduced to a minimum, which arm may be bent as at 20, and preferably across the motor 6, for the sake of easy handling, and secured to said bent-over portion, in any way in practice suggested is the hand grip 22, preferably made of wood, and hollowed out to receive extensions of the electric leads 24 of the motor 6.

At any convenient point of the hand grip 22, and positioned internally of said grip is the switch 26, of conventional or other form, which switch has an operating arm 28 (Fig. 3), said arm being operable within a slot formed within the preferably removable plate 30, associated with the grip 22 in any manner desired. As indicated in Figs. 3 and 7, the switch 26 is in circuit with a plug 32 to which the leads from a source of electric energy, as, for example, the electric wiring of a dwelling, may be attached. The electric circuit in Fig. 7 is conventional, and further description thereof is not deemed necessary.

To transmit the rotary movement of the shaft 34 of the motor 6 to the cutter elements, and convert said movement into a reciprocatory one, said shaft is provided with a fly wheel 36 of suitable dimensions, material and weight, which fly wheel may take the form shown in Figs. 1, 2 and 3, or that shown in Fig. 8. In the latter figure, preferably three spokes 36' are provided, and in one of said spokes a special means for locking the fly wheel to the shaft 34 is provided. Said means preferably comprises a screw pin 38, pointed as at 40, which point is adapted to be screwed into a cavity 42, in the shaft 34, thus securely locking said fly wheel to said shaft. If desired, the screw pin 38 may be countersunk within the fly wheel. Since the fly wheel 36 depicted in Figs. 1, 2 and 3 is secured to the shaft 34 in an identical manner, further illustration is not deemed necessary. It will, of course, be understood that other means of securing the fly wheel 36 to the shaft 34 may be provided.

To convert the rotary movement of the shaft 34 into a reciprocating movement, a slotted standard or guide 43 is provided, which standard has a base 44, preferably integral therewith, said base being secured in any preferred way to the reciprocating upper cutter element 46, as by bolts 48 to a boss 50, either integral with or associated with said element 46, in any manner in practice preferred, the purpose of said boss being to provide for a clearance for the fly wheel 36.

Movable within the slot 52 of the standard or guide 43 is a preferably detachable pin 54 (Figs. 2 and 3), which pin has a cavity 53 to be engaged by the screw pin 58, of identical construction with the pin 38 (Fig. 8), said pin 58 being also countersunk within the fly wheel so as not to project therefrom, the inner part of which engages with said cavity 53 to lock the pin 54 in position. As seen in Fig. 8, a means may be provided for varying the speed of travel of the cutter element 46. This means may take the form of an additional hole 54', (Fig. 2), positioned at a different level than the hole in which the pin 54 is positioned so a variation of the speed of the cutter elements may be provided. To accomplish this, the pin 54 is removed, together with the screw lock pin 58, which are replaced in another arm of the fly wheel as seen in Fig. 8, or in the solid wheel as shown in the other form of our invention, the pin 54 being then positioned within the slot 52 at a different level, thus providing for a variation of speed, so that thick or thin foliage may be cut with ease and efficiency.

The upper cutter element 46 may be provided with cutter teeth 60 reciprocable over the teeth 10 of the lower cutter 8, and the cutter 46 may be provided with a wedge shaped cavity 62, preferably slightly curved, as shown in Fig. 5 so as to provide for a minimum contacting surface with the wedge shaped projection 64 on the stationary lower cutter element 6, to reduce friction to a minimum, said upper or reciprocating cutter element 46 having its movement limited with the confines of said lower cutter element 8, eliminating all danger when the trimmer is being operated.

If desired, the trimmer may be provided with a housing 66 for excluding dust and cuttings, said housing enclosing the motor and fly wheel, which housing may be detachably secured in position in any way in practice preferred.

To vary the angle of the handle 18 with respect to the cutting elements, that is, to adjust the same relative thereto, the standards are provided with any preferred number of screw holes 68, locked by the screw key 70 (Fig. 4) so said handle may be swung to the dotted position shown in said figure, said handle swinging on the pivot 72. This not only facilitates cutting a shrub or hedge at the side or at an angle, but prevents the unauthorized use of the trimmer, if the screw key 70 is removed.

In operation, the handle 18 is keyed in its desired position, the plug 32 connected to the source of electric energy, after which the arm 28 of the switch 26 moved. This causes the motor 6 to reciprocate the upper cutter 46 over the lower cutter 8, and the trimmer may be moved by the grip 22 over the hedge, accomplishing the cutting in a remarkably short time, and without any effort on the part of the operator. The various parts of the device may be made of any light metal to reduce the weight of the trimmer to a minimum.

While we have thus described our invention with great particularity, it is clear to be seen that the same may be modified throughout a wide range. Accordingly we do not propose to be limited to the exact details of construction shown and described, but reserve the right in practice to make any and all modifications thereof that fall within the scope of the appended claims.

We claim as our invention:

1. A motor hedge trimmer comprising a base having a bracket, a set of relatively movable cutter blades, complementary devices associated with said blades for steadying the relative movement of said blades and reducing the friction therebetween to a minimum, a motor on said base for operating said blades, and a combined motor control and trimmer applying means for said motor, and comprising an L-shaped handle including an arm detachably connected to said bracket, and a grip associated with said handle and superimposed over said motor.

2. In a device of the class described having a pair of relatively reciprocating cutter elements and a motor for operating the same, the combination of a fly wheel adapted to be actuated by said motor, means associated with said fly wheel whereby the speed of said cutter elements may be varied, a combined motor control and trimmer applying means whereby said trimmer may be operated, a base upon which said motor is positioned, a bracket connected to said base, said last named means comprising an L-shaped handle including an arm detachably connected to said bracket, and a grip associated with said handle and superimposed over said motor.

3. In a hedge trimmer, a pair of relatively movable cutter blades, a motor for operating said blades, a base upon which said motor is mounted, a bracket on said base, a detachable dust excluding housing for said motor, a combined motor control and trimmer applying means associated with said trimmer and comprising an L-shaped handle including an arm detachably connected to said bracket, and a grip on said handle and superimposed over said motor, key means for holding said last mentioned means in adjusted position relative to said trimmer, and openings in said trimmer, said key means being adapted to be inserted in and removable from said openings.

In testimony whereof, we have signed our names to this specification.

JOE LEPIANE.
PETER LEPIANE.